United States Patent [19]

Persons, II et al.

[11] 4,223,905
[45] Sep. 23, 1980

[54] COMBINATION CYCLE SEAT-SKATEBOARD

[75] Inventors: Charles Persons, II; Robb Harst, both of Norwalk, Ohio

[73] Assignee: Persons-Majestic Manufacturing Company, Worcester, Mass.

[21] Appl. No.: 972,046

[22] Filed: Dec. 21, 1978

[51] Int. Cl.³ ............................ A63C 17/00; B62J 1/28
[52] U.S. Cl. ................................. 280/289 R; 280/7.17; 280/87.04 A; 297/118; 297/195; D6/48.1; D21/227

[58] Field of Search .................... 280/87.04 A, 30, 32, 280/32.5, 7.1, 7.15, 7.17, 220, 224, 225, 226 R, 233, 289 R; 297/117, 118, 195; D21/226, 227; D6/48.1; 272/72, 73, 127

[56] References Cited

U.S. PATENT DOCUMENTS

| 427,110 | 5/1890 | Quevedo | 280/220 |
| 3,979,135 | 9/1976 | Meritzis | 280/226 R |

FOREIGN PATENT DOCUMENTS 692247  7/1965  Italy ........................................ 280/220

Primary Examiner—John A. Pekar
Attorney, Agent, or Firm—Squire, Sanders & Dempsey

[57] ABSTRACT

A cycle seat having wheels and which is detachable from the cycle and useable as a skateboard.

9 Claims, 5 Drawing Figures

COMBINATION CYCLE SEAT-SKATEBOARD

BACKGROUND OF THE INVENTION

1. Field of the Invention

This invention relates to cycle seats and to skateboards, in particular to devices which are used as both cycle seats and skateboards.

2. Description of the Prior Art

A seat is a common component of all kinds of cycles, such as unicycles, bicycles, tricycles, mopeds, and motorcycles. Elongated cycle seats have been utilized for many years. For example, U.S. Patent to Karbin, U.S. Pat. No. 3,258,290, discloses an elongated bicycle seat. Some cycle seats have been designed to fulfill dual purposes, this is, to serve another function in addition to being a seat. For example, U.S. Patent to Winfree, U.S. Pat. No. 3,771,827, discloses a bicycle seat which also includes a compartment for a radio.

A skateboard is a wheeled toy comprising a board and wheels and which is ridden by its user, usually down an inclined surface. Some wheeled toys are designed for conversion to other purposes. For example, U.S. Patent to Thorson, U.S. Pat. No. 3,109,645, discloses a rolling toy convertible to use as a teeter-totter.

U.S. Patent to Lehmann, U.S. Pat. No. 3,436,119, discloses a combination ice fishing chair and sled.

The prior art has failed to produce cycle seats which can be detached from the cycle and then used as a skateboard.

Skateboards are sometimes carried by cycle riders, usually children or adolescents riding bicycles. This can be unsafe when the rider is occupied with both operating the cycle and holding the skateboard. Even when the skateboard is carried on a cycle by mechanical means, as by putting it in a basket attached to the cycle or by lashing it to a luggage carrier attached to the cycle, it causes inconvenience by taking up space that could otherwise be utilized. Furthermore, when skateboards are carried on cycles by means not specially adapted for skateboards, they are not protected from damage during operation of the cycle, such as by being bounced around in a basket. In addition, skateboards can be easily misplaced or stolen because they are small and very portable. When they are firmly attached to larger devices, such as cycles, they are less easily lost. Finally, expense is reduced and convenience increased when several functions are combined into one device because of the more efficient use of materials and space.

SUMMARY OF THE INVENTION

It is an object of this invention to provide a seat for a cycle which is quickly convertible into a wheeled toy for use as a skateboard.

It is also an object of this invention to provide a seat which can be firmly attached to a cycle body, but which may be easily and quickly detached for use as a wheeled vehicle.

A further object of the invention is the provision of a skateboard which can be mounted on a cycle to function as a seat therefor.

Another object of the invention is to provide a bicycle having a seat alternatively useable as a skateboard.

Another object of the invention is to provide a safe and convenient way of carrying a skateboard on a cycle.

It is yet another object of the invention to provide an economical and convenient combination cycle seat and skateboard.

Other objects of the invention will be apparent to those skilled in the art to which the invention pertains from the description to follow and from the appended claims.

The foregoing objects are achieved by the provision of a cycle seat with wheels and which may be detached from the cycle and used as a skateboard.

DESCRIPTION OF THE PREFERRED EMBODIMENT

Figure 1:
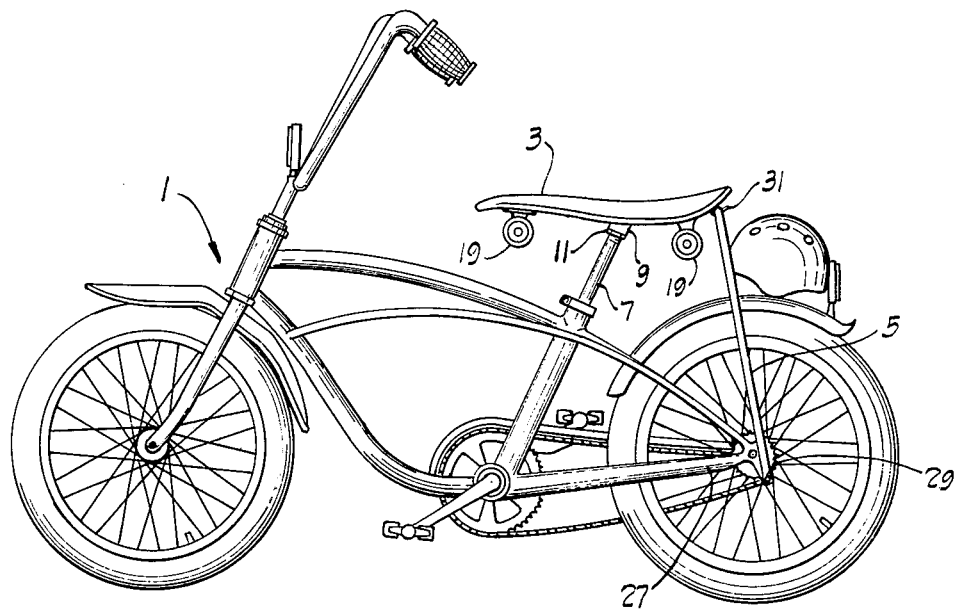
FIG. 1 is a side view of a bicycle 1 incorporating a cycle seat 3 according to the invention.
Figure 2:
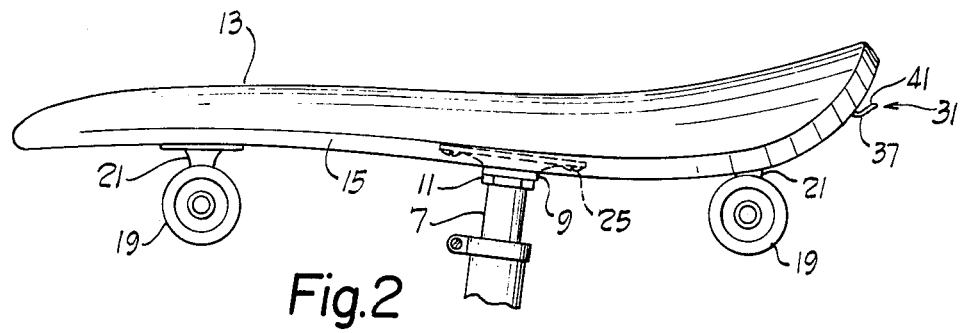
FIG. 2 is a fragmentary side view of a seat attached to a bicycle according to the invention.
Figure 3:
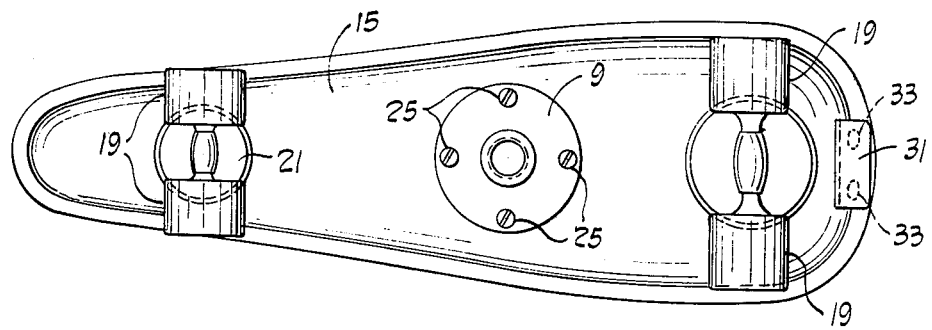
FIG. 3 is a bottom view of a cycle seat according to the invention.
Figure 4:
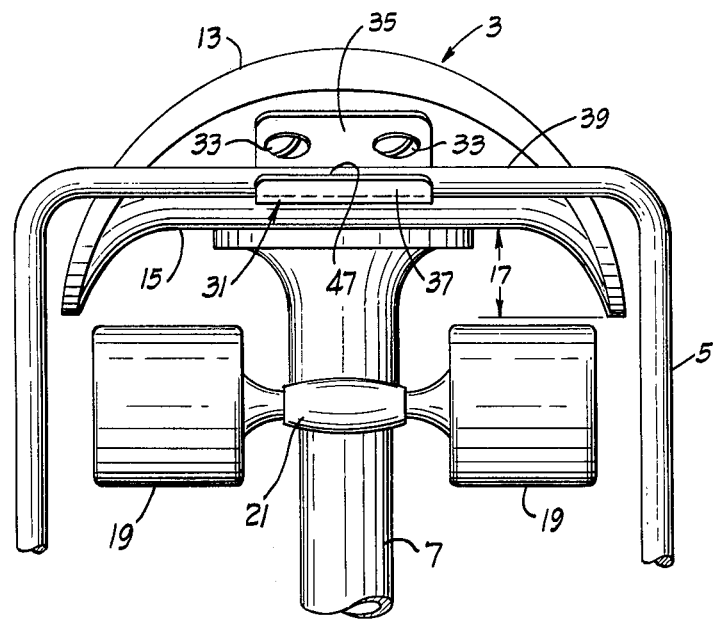
FIG. 4 is a rear view of a cycle seat attached to a bicycle safety bar 5 according to the invention.
Figure 5:
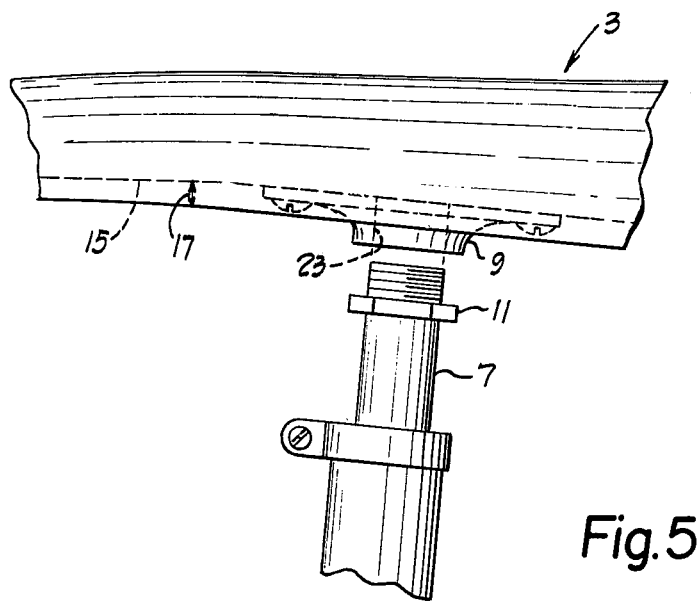
FIG. 5 is an exploded side view of a threaded seat support post 7 and a coupling plate 9 for attaching a cycle seat to a cycle according to the invention.

The preferred embodiment of the invention comprises a bicycle seat having an elongated body with a somewhat curved but generally flat upper surface and a lower surface to which two pairs of rotatable wheels are secured. The preferred embodiment comprises a bicycle seat, although seats for other cycles are within the scope of the invention. Furthermore, apparatus according to the invention may include more or fewer wheels, but the preferred embodiment includes two pairs of wheels mounted on parallel axles, corresponding to the construction of a typical skateboard. The preferred embodiment also includes a bicycle with such a combined bicycle seat and skateboard attached. In its preferred form, the bicycle has a safety bar which is attached to both the frame of the bicycle and the back of the combination seat.

Referring to the drawings, a bicycle 1 is depicted having a seat 3 attached to a threaded seat post 7 by means of a metal coupler 9 and a lock nut 11, and to a safety bar 5. The seat has a curved top surface 13 and a generally flat bottom surface 15. The top of the seat is slightly curved laterally and longitudinally, and extends along the side of the seat to overhang the bottom surface by a distance 17 past the bottom. The seat is curved on top so that a rider can sit thereon comfortably in the conventional manner straddling the seat, but it is also large and flat enough for someone to stand on it when used as a skateboard. The bottom of the seat is flat to facilitate attachment of the other necessary parts. The top of the seat is curved past the bottom of the seat so as to present no edges to bruise or irritate the thighs of the bicycle rider. The seat may be constructed from a variety of materials in various configurations known to one skilled in the art. For example, the seat can be made as a single molded plastic piece. The seat can also be made with a metal or plastic base and a padded upper surface which is covered by leather, plastic, or the like.

Wheels 19, such as typically used on skateboards, are mounted in pairs on wheel mounts 21. The wheels are usually made of hard rubber or plastic, and preferably have widths greater than their diameters to provide vertical stability when the device is used as a skateboard. However, the wheels are recessed inside of the sides of the seat so as not to be in the way of a person seated thereon. The wheel mounts can also be of the same types as those used on conventional skateboards, and in their simplest form are single cast metal pieces. Such wheel mounts can have outward extending arms which serve as nonrotating axles for the wheels. The wheel can be slipped onto the axle from the outer end. Each wheel can have one or two sets of ball bearings sealed in races and disposed between the wheel and its axle in order to reduce friction. The ends of the outward extending axles can have threaded holes for receiving a bolt with washer which is used for retaining the wheel. The wheel mounts can also be made from two or more metal pieces with rubber liners where the pieces join; this construction allows play in the joints and can be adapted to allow some shifting of weight by the skateboard rider without forcing the lifting of the wheels from the pavement. Each wheel preferably rotates about an independent axle fixed to one of the wheel mounts. Thus, each wheel can be free to rotate independently of all the other wheels. The wheel mounts are attached to the bottom of the seat by appropriate fasteners such as screws. Thus, when the cycle seat is mounted on the bicycle, the wheels are under the seat and out of the way, thereby protecting the wheels from damage when the seat is not being used as a skateboard.

The seat is attached to the bicycle by coupling plate 9 which is screwed on to a threaded seat support post 7 and fastened into position by a lock nut 11. The coupling plate is a metal plate with a threaded hole 23 and is attached to the bottom 15 of the seat by screws 25. The threads of the threaded hold 23 match the threads of the threaded seat post. The threads preferably have a wide pitch to facilitate fast attachment or removal by the seat to or from the post. Thus, the seat can easily be attached or detached from the bicycle simply by screwing or unscrewing the seat from the seat support post. The lock nut is used to tighten the seat onto the seat support post and to maintain the proper alignment of the seat.

A safety bar 5 is pivotally attached to the frame 27 of the bicycle. A nut and bolt can be used on each side of the bicycle to attach the safety bar to the bicycle frame through a hole 29 in the safety bar and a corresponding hole in the frame. A washer may be placed on the bolt between the bicycle frame and the safety bar. Thus, the safety bar can be firmly attached to the frame and also be allowed to pivot by loosening the nut and bolt assemblies. The seat is removably attached to the safety bar, as explained below. The safety bar is turned pivotally about the point at which it is fastened to the bicycle frame, until the safety bar is in proper position, and then the seat and bolt assemblies are tightened. Such safety bars, sometimes called "sissy bars," are popular on bicycles. They provide additional support between the seat and the frame of the bicycle.

The safety bar is attached to the cycle seat by means of a resilient clip 31 which is attached to the bottom of the seat by two screws 33. The resilient clip is preferably a metal strip bent into a U-shape and has an upper arm 35 and a lower arm 37. The distance between the upper and lower arms of the clip is approximately the same as the diameter of cylindrical member acting as a cross bar 39 on the safety bar 5. The clip is bent so that at the open end 41 of the clip, the distance between the upper and lower arms is slightly less than the diameter of the cross bar so that the clip resiliently engages a received safety bar.

In practice the safety bar is tightly fastened to the frame of the bicycle. The safety bar is fastened into place on the bicycle such that a cylindrical member acting as a cross bar 39 is in a position generally opposite the opening of the clip attached to the seat. There is sufficient give in the material of the safety bar itself so that as the safety bar is pushed forward the cross bar snaps into the clip, thereby securing the safety bar to the seat without loosening the nut and bolt assemblies which attach the safety bar to the frame of the bicycle. Since the opening in the clip at the open end is smaller than the cross bar, the cross bar is held in place until sufficient force is applied to the safety bar from the front to unsnap the cross bar from the clip. The clip could also be formed with an inward facing bend or flange near the open end to help retain the cross bar. Using such means to attach the seat to a safety bar, the seat and bicycle are given additional structural stability without sacrificing the ability to easily remove the seat from the bicycle. Although a metal clip has been shown as the means for attaching the back of the seat to the cycle, other forms of seat attaching means may be appropriate with various types of cycles and seat configurations. Moreover, the retaining means can be dispensed with is the event the primary seat support means offers sufficient support for the seat.

The preferred embodiments described herein fulfill the objects of the invention. A bicycle seat that can also be used as a skateboard has been disclosed. This seat is firmly, but removably attached to the bicycle. The within disclosure also shows a convenient and safe way to carry a skateboard on a bicycle. The cycle rider is not distracted by having to carry the skateboard. When attached to the bicycle the skateboard is protected from damage and from being lost. Since the within disclosure is multifunctional, it is economical and convenient.

The invention has been described with particular reference to the preferred embodiment, but it will be understood that variations and modifications within the spirit and scope of the invention may occur to those skilled in the art to which the invention pertains.

What we claim is:

1. Apparatus alternatively useable as a cycle seat and as a skateboard, said apparatus comprising:
    a seat member having a top surface for supporting a person and a bottom surface;
    a plurality of wheels;
    means for attaching said wheels to said bottom surface of said seat member for rotation about parallel horizontal axes; and
    means for removably attaching said apparatus to a cycle.

2. The invention according to claim 1, wherein said apparatus is mountable on a support post of a cycle, and said means for removably attaching said apparatus to said cycle comprises coupling means attached to said bottom surface of said seat, said coupling means having receptacle means for receiving said support post, and locking means for releasably locking said support post in said receptacle means.

3. The invention according to claim 2, wherein said coupling means comprises a plate, said receptacle means comprises a threaded hole in said plate, said support post being threaded to match said threaded hole, and said locking means comprises a lock nut threaded to match said support post.

4. The invention according to claim 1, wherein said seat member is elongated in the direction perpendicular to said horizontal axes.

5. The invention according to claim 4, wherein said top surface of said seat member is generally flat.

6. The invention according to claim 5, wherein said top surface of said seat member has a rounded periphery.

7. The invention according to claim 1, wherein said top surface of said seat member comprises a surface for supporting a seated person when said seat is attached to said cycle and for supporting a standing person when said wheels are on the ground.

8. A bicycle comprising a seat support member, a seat removably attached to said support member, said seat including a plurality of wheels and means for attaching said wheels to the bottom of said seat for rotation about parallel horizontal axes, and further including a safety bar member attached to said bicycle, and means for removably attaching said seat to said safety bar.

9. The invention according to claim 8, in which said safety bar comprises a generally cylindrical member; and said means for attaching said seat to said safety bar comprises a U-shaped resilient clip attached to said seat, said clip having spaced upper and lower arms for receiving and engaging said cylindrical member therebetween.

* * * * *